United States Patent [19]

Tigel Gil et al.

[11] Patent Number: 5,658,468

[45] Date of Patent: Aug. 19, 1997

[54] ELASTIC MEMBRANE PRESS FILTER AND FILTRATION METHOD USING IT

[75] Inventors: Rafael Tigel Gil, Limelette; Jean Biche, Froyennes, both of Belgium

[73] Assignees: Interbrew S.A., Bruxelles; Atelier Louis Carton S.A., Tournai, both of Belgium; Krontec S.A., Luxembourg, Luxembourg

[21] Appl. No.: 408,943

[22] Filed: Mar. 23, 1995

[30] Foreign Application Priority Data

Apr. 1, 1994 [FR] France .................. 94 03885

[51] Int. Cl.$^6$ .................................. B01D 37/00
[52] U.S. Cl. .................. 210/770; 210/224; 210/227; 210/231
[58] Field of Search .................. 210/231, 232, 210/224, 227, 767, 770, 456; 100/195, 196, 209

[56] References Cited

U.S. PATENT DOCUMENTS

| | | | |
|---|---|---|---|
| 1,011,130 | 12/1911 | Dorff | 210/224 |
| 3,330,414 | 7/1967 | Meckey | 210/227 |
| 3,669,267 | 6/1972 | Hutton | 210/231 |
| 4,346,003 | 8/1982 | Polyakov et al. | 210/225 |
| 4,427,554 | 1/1984 | Busse et al. | 210/224 |
| 4,781,828 | 11/1988 | Kupka | 210/231 |
| 4,931,177 | 6/1990 | Darmentier | 210/231 |
| 5,133,879 | 7/1992 | Tiittanen et al. | 210/224 |
| 5,198,123 | 3/1993 | Stöver et al. | 210/231 |

FOREIGN PATENT DOCUMENTS

| | | |
|---|---|---|
| 132201 | 7/1902 | Germany. |
| 2503674 | 7/1975 | Germany. |
| 858634 | 1/1961 | United Kingdom. |
| 9220424 | 11/1992 | WIPO. |

*Primary Examiner*—Ana Fortuna
*Attorney, Agent, or Firm*—Bachman & LaPointe, P.C.

[57] ABSTRACT

An elastic membrane filter, in particular for filtration of mash, has a lower feed pipe and a second or upper feed pipe passing through the filter elements at a location opposite the lower feed pipe, the upper feed pipe being connected of the lower feed pipe so that it is fed with liquid to be filtered from the downstream end of the lower feed pipe and flowing in the opposite direction to the liquid in the lower feed pipe, a pipe connecting the lower and the upper feed pipes.

7 Claims, 2 Drawing Sheets

5,658,468

ELASTIC MEMBRANE PRESS FILTER AND FILTRATION METHOD USING IT

BACKGROUND OF THE INVENTION

1. Field of the Invention

The present invention concerns a new elastic membrane press filter. It also concerns a filtration method using said press filter.

The present invention concerns in particular an elastic membrane press filter, in particular a mash filter, made up of filter elements each comprising a frame and a filtration plate carrying a filtration member for forming a filtration chamber, a lower feed pipe passing through each filter element with inlet pipes and inlet pipe orifices, enabling the liquid to be filtered to flow from said lower feed pipe into said filtration chambers.

2. Description of the Prior Art

Elastic membrane press filters are well known and widely used. Each filter element comprises an elastic member which separates two chambers, said filtration chamber which receives the liquid to be filtered and containing solid materials and an air chamber which delimits a space into which air can be fed. By pressurizing the air the membrane is moved towards said filtration member, so compressing the solid material contained in the liquid to be filtered into the form of a "cake".

These press filter elements have various drawbacks, however. For example, when the elastic membrane starts to move towards the filtration member, the entry of the liquid to be filtered is not interrupted quickly, which causes a quantity of the liquid to be returned to the feed pipe. This can lead to soiling of the inlet pipe orifice. These phenomena are more marked if the inlet pipe orifice is closed very tardily.

A main object of the invention is to optimize the filter capacity of all the elements constituting the press filter independently of the distance of the filter elements from the place at which the products to be filtered enter the lower feed pipe.

Another object of the invention is to remedy most of the above drawbacks, especially those connected with soiling of the feed pipe orifice.

SUMMARY OF THE INVENTION

The elastic membrane press filter of the invention, in particular a mash filter, made up of filter elements each comprising a filtration frame and a plate carrying a filtration member for forming a filtration chamber, a lower feed pipe passing through each filter element with inlet pipes and inlet pipe orifices enabling the liquid to be filtered to flow from said lower feed pipe into said filtration chambers, comprising a second or upper feed pipe passing through the filter elements at a location opposite said lower feed pipe, said upper feed pipe being connected to the lower feed pipe so that it is fed with liquid to be filtered coming from the downstream end of the lower feed pipe and flowing in the opposite direction to the liquid in the lower feed pipe, a pipe connecting said lower and said upper feed pipes.

In one preferred embodiment of the invention the elastic membrane of the filter element of the invention cuts off the supply to the filtration chamber of the liquid to be filtered practically as soon as the air pressure is increased in the air chamber on the other side of the membrane.

In this preferred embodiment of the invention a mash inlet pipe orifice through the filtration plate, in this instance the plate which forms the filtration chamber, discharges into the latter in such a way that the plane through the inlet pipe orifice is at an angle of not more than 30° to the elastic membrane.

In accordance with the invention, the inlet pipe has a geometrical axis at an angle of not more than 60° to the elastic membrane in its rest position.

In a particularly advantageous embodiment of the invention the above inlet pipe discharges opposite the elastic membrane at a location as close as possible to the frame to which the edge of the elastic membrane is attached.

The invention also concerns a method of filtering mash using the press filter of the invention. An object of the method is to optimize the conditions under which the filter of the invention is operated.

The method of the invention comprises the following steps: introducing the liquid to be filtered via the lower feed pipe until all the filtration chambers are filled, opening an optional valve separating the lower and upper feed pipes when all the filtration chambers have been filled from said lower feed pipe, continuing filtration by feeding the filtration chambers also from said upper feed pipe.

Because of a static counter-pressure effect in the connecting pipe between the upper and lower feed pipes when filling the filter, the placement and the use of the valve separating the upper and lower pipes are optional.

Other features and advantages of the invention will emerge from the following more detailed description of an elastic membrane press filter and a mash filtration method of the invention. It goes without saying that this description is given by way of purely illustrative example only and is in no way limiting on the present invention. The numerical references in the following description relate to the figures.

DETAILED DESCRIPTION OF THE PREFERRED EMBODIMENT

Figure 1:
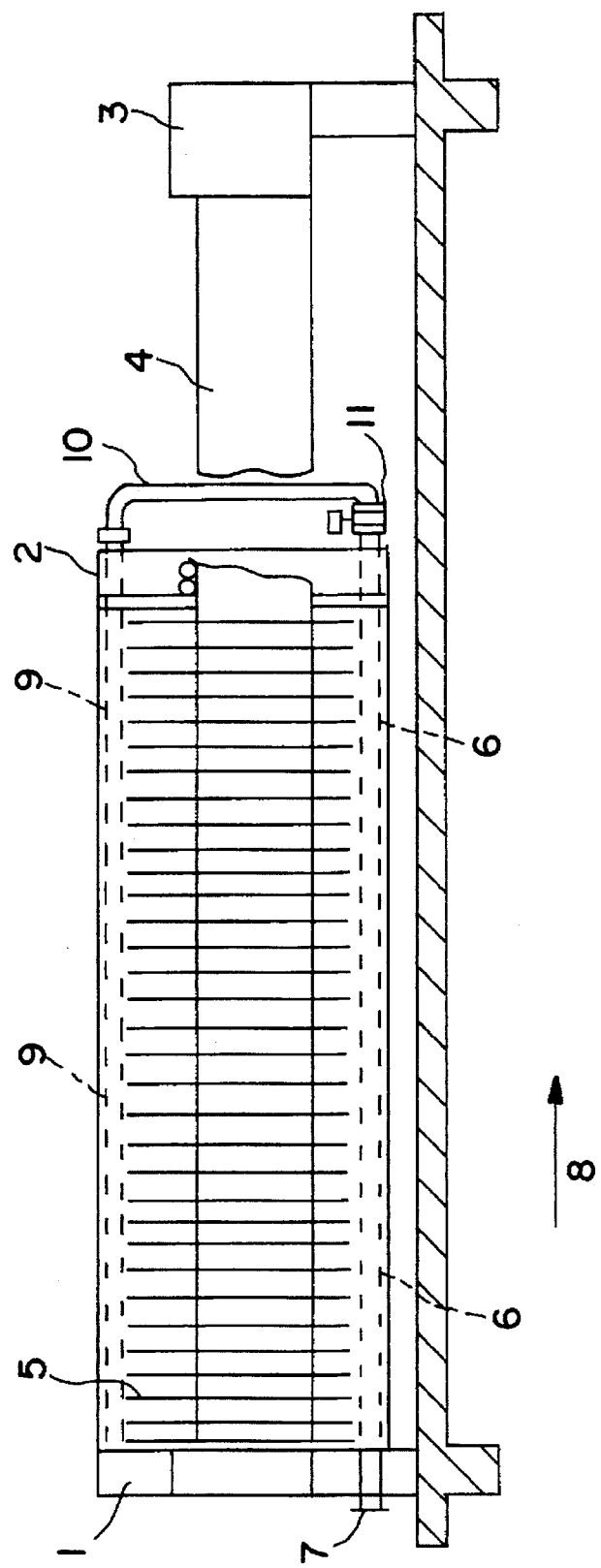
FIG. 1 is a diagrammatic side view of one embodiment of the press filter of the invention.

Referring to FIG. 1, the press filter of the invention includes, in the conventional way, a frame with a fixed end 1 and a mobile end 2. The rear box-section 3 and one of the two longitudinal members 4 along which the filter elements 5 can be displaced are shown in FIG. 1.

For a good understanding of the invention it has been deemed sufficient to restrict the diagrammatic representation of the press filter to those components shown in FIG. 1. Thus the means whereby the filter elements are displaced along the longitudinal members 4 are not shown.

Until now, the filtration chambers, restricted in each of the filter elements to the space between the filter cloth and the flexible membrane adapted to compress the cake, have been filled via a lower feed pipe 6. The filter elements are fed from the end 7 of the lower feed pipe 6.

The liquid to be filtered entering the lower feed pipe 6 flows in the direction shown by the arrow 8. In prior art filters, as filtration progresses the distribution of the solid fraction of the liquid to be filtered between the filter element filtration chambers soon becomes irregular.

The filter of the invention remedies this irregular distribution of the solid fraction in a remarkable way which leads to optimization of the filter elements.

This is achieved by extending the lower feed pipe 6 by means of an upper feed pipe 9 connected to the latter by a vertical or substantially vertical pipe section 10 into which a valve 11 is advantageously connected.

The upper feed pipe 9 therefore fulfills exactly the same function as the lower feed pipe 6. During filtration the filtration chambers are fed from the upper and lower pipes, either by opening the valve 11 or by virtue of a communicating vessel effect if the valve 11 is not installed. This equalizes the filling of the filtration chambers both quantitatively and from the point of view of distribution of particle sizes, because of the double feeding in opposite directions from the lower and upper feed pipes. This substantially improves the performance of the filter.

Figure 2:
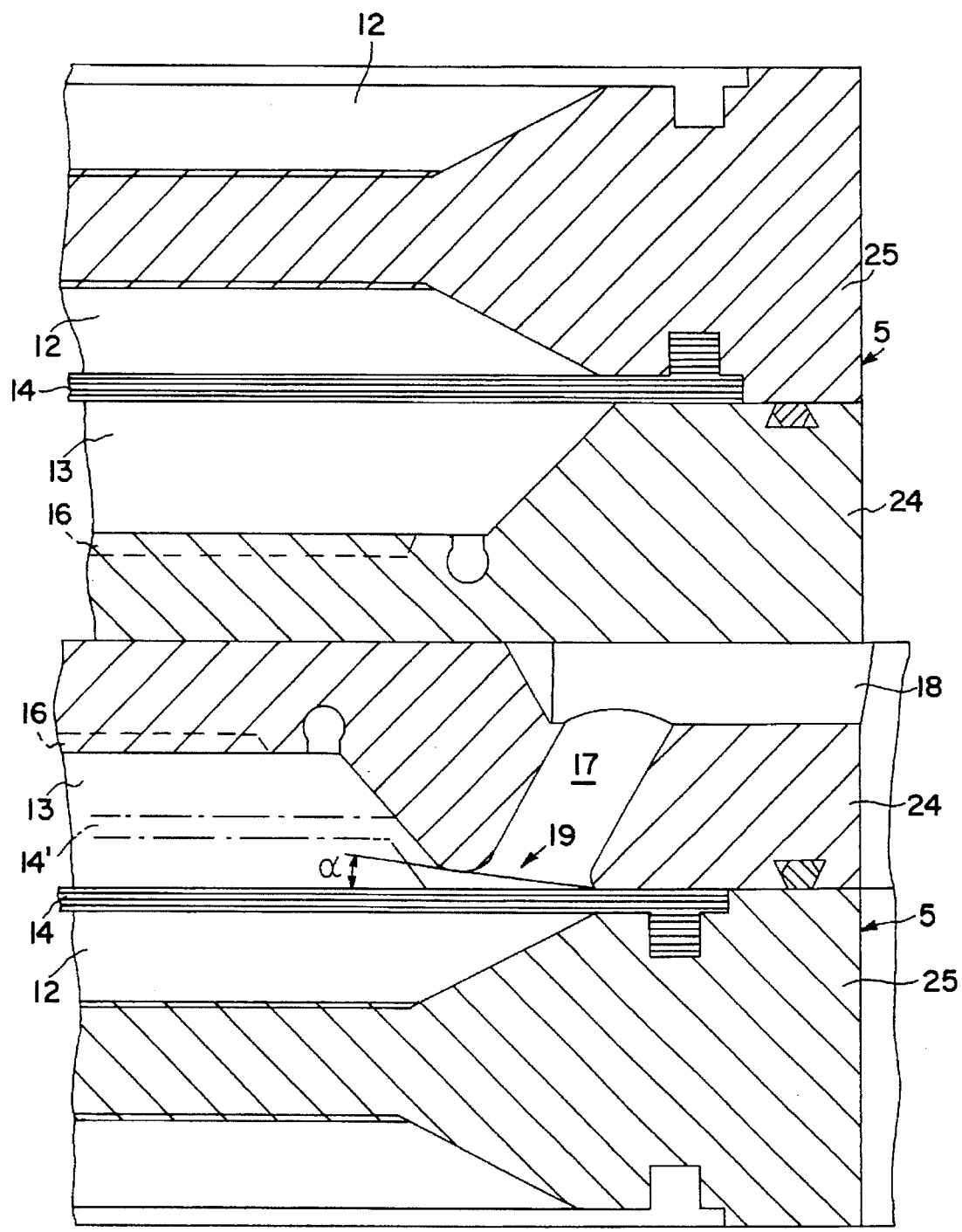
FIG. 2 shows two membrane filter elements of the invention in transverse section.

Referring to FIG. 2, the elastic membrane filter elements 5 shown in cross-section in FIG. 2, various purely structural details of which are not shown, comprise an air chamber 12 and a filtration chamber 13 separated by a membrane 14. The membrane 14 is clamped in a known manner between the filtration plate 24 and the frame 25 of the filter element 5.

The membranes 14 are shown in full line in FIG. 2 in their rest position. The filtration members 16 are shown in dashed line.

The membranes 14 are displaced towards the filtration members 16 by the pressure of the air in each of the chambers 12. FIG. 2 does not show the air feed pipes used for this purpose.

However, the position of one of the membranes (in this instance the membrane 14') when displaced by the effect of the air pressure is shown in chain-dotted line, this movement being towards the filtration members 16 in order to compress the cake.

It has been found that correct operation of the filter is impeded if, when the membrane has been displaced by the pressure of the air in the air chamber 12, the entry of liquid to be filtered in the filtration chamber 13 via the inlet pipe 17 which extends the feed pipe 18 is not shut off quickly. Reflow of the liquid to be filtered then occurs via the inlet pipe 17 and the feed pipe 18.

In this case the inlet pipe orifice is regularly soiled, which is undesirable.

In accordance with the invention, it is now possible to stop the entry of liquid to be filtered immediately after the membrane 14 begins to move due to the effect of the air injected into the chambers 12. This is achieved by disposing the inlet pipe 17 and in particular its orifice 19 in a plane relative to a membrane 14 at rest such that the inlet pipe 17 is shut off by the membrane 14 as soon as it is displaced because of an increase in the variable volume of the chamber 12 due to the air injected into it.

This is achieved by virtue of the defined angle α between the plane through the inlet orifice 19 and the membrane 14 at rest.

This angle α is advantageously between about 10° and about 30° so that as soon as the membrane 14 occupies the position 14' shown in chain-dotted line in FIG. 2 the orifice 19 is shut off and the increase in the pressure of the air in the chamber 12 progressively closes off this orifice totally.

In practice, the angle between the geometrical axis of the inlet orifice 19 and the membrane 14 at rest is not the only determining factor.

In a filter element of the type in question, the inlet pipe 17 and its orifice 19 are preferably disposed near the location at which the edge of the membrane 14 is held between the filtration plate 24 and the frame 25 of the filter element.

From the description just given of the elastic membrane filter of the invention it will be understood that the inlet pipe orifice 19 is shut off virtually instantaneously, as soon as the membrane 14 begins to move towards the filtration member 16 due to the increase in volume and pressure of the air in the chambers 12.

It goes without saying that the invention is not limited to the preferred embodiment just described and that modifications may be made thereto without departing from the essential features of the invention, the scope of the protection being defined by the following claims.

There is claimed:

1. Method of filtering a liquid using an elastic membrane press filter made up of filter elements, each of said filter elements comprising a frame and a filtration plate carrying a filtration member, the frame and the filtration plate holding between them an elastic membrane separating two chambers including a filtration chamber located between said membrane and said filtration member and adapted to receive a liquid to be filtered containing solid materials, and an air chamber located on the other side of said elastic membrane and into which pressurized air can be fed, a liquid inlet pipe being arranged through each filtration plate and opening through an orifice in the filtration chamber, wherein said orifice has a plane extending at an angle α with respect to said elastic membrane of not more than 30° when said elastic membrane is at rest, so that said elastic membrane will shut off said orifice as soon as pressurized air is injected in the air chamber in order to displace said elastic membrane towards the corresponding filtration member, a first feed pipe communicating with the filtration chamber of each filter element by a corresponding liquid inlet pipe opening through an orifice in said filtration chamber, and a second feed pipe communicating similarly with the filtration chamber of each filter element at a location substantially opposite said first feed pipe, said press filter further comprising means for connecting a downstream end of said first feed pipe with an upstream end of said second feed pipe so that said second feed pipe is fed with liquid to be filtered coming from said downstream end of the first feed pipe, said liquid in said second feed pipe flowing in an opposite direction to the liquid flowing in the first feed pipe, and said connecting means comprising a pipe connecting said first and said second feed pipes, said method comprising the following steps:

introducing the liquid to be filtered via the first feed pipe until all of the filtration chambers are filled; and thereafter causing said liquid to be filtered to flow from said first feed pipe to said second feed pipe and continuing filtration by feeding the filtration chambers also from said second feed pipe.

2. The method of claim 1 wherein said causing step comprises opening a valve positioned between said first and second feed pipes after all of the filtration chambers have been filled from said first feed pipe.

3. An elastic membrane press filter, in particular for filtration of mash, made up of filter elements, each of said filter elements comprising a frame and a filtration plate carrying a filtration member, the frame and the filtration plate holding between them an elastic membrane separating two chambers including a filtration chamber located between said membrane and said filtration member and adapted to receive a liquid to be filtered containing solid materials, and an air chamber located on the other side of said elastic membrane and into which pressurized air can be fed, a liquid inlet pipe being arranged through each filtration plate and opening through an orifice in the filtration chamber, wherein said orifice has a plane extending at an angle α with respect to said elastic membrane of not more than 30° when said elastic membrane is at rest, so that said elastic membrane will shut off said orifice as soon as pressurized air is injected in the air chamber in order to displace said elastic membrane towards the corresponding filtration member.

4. A filter according to claim 3 wherein the liquid inlet pipe has a geometrical axis at an angle of 60° maximum to the elastic membrane when the elastic membrane is at rest.

5. A filter according to claim 3 wherein the liquid inlet pipe discharges facing the elastic membrane at a location as close as possible to the frame holding an edge of the elastic membrane.

6. An elastic membrane press filter according to claim 3, comprising a first feed pipe communicating with the filtration chamber of each filter element by a corresponding liquid inlet pipe opening through an orifice in said filtration chamber, and a second feed pipe communicating similarly with the filtration chamber of each filter element at a location substantially opposite said first feed pipe, said press filter further comprising means for connecting a downstream end of said first feed pipe with an upstream end of said second feed pipe so that said second feed pipe is fed with liquid to be filtered coming from said downstream end of the first feed pipe, said liquid in said second feed pipe flowing in an opposite direction to the liquid flowing in the first feed pipe, and said connecting means comprising a pipe connecting said first and said second feed pipes.

7. A filter according to claim 6 wherein the first feed pipe is a lower feed pipe and the second feed pipe is an upper feed pipe.

* * * * *